No. 662,930. Patented Dec. 4, 1900.
M. GERVAIS.
PETROLEUM LAMP.
(Application filed Nov. 27, 1899.)

(No Model.) 2 Sheets—Sheet 1.

Witnesses
Thos. Fitzpatrick
Geo. ...

Inventor
Marcel Gervais
by Alexander & Co
Attorneys

No. 662,930. Patented Dec. 4, 1900.
M. GERVAIS.
PETROLEUM LAMP.
(Application filed Nov. 27, 1899.)
(No Model.) 2 Sheets—Sheet 2.
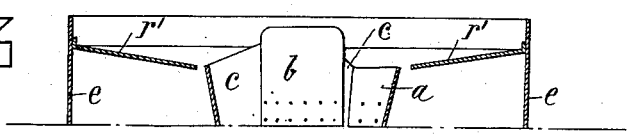
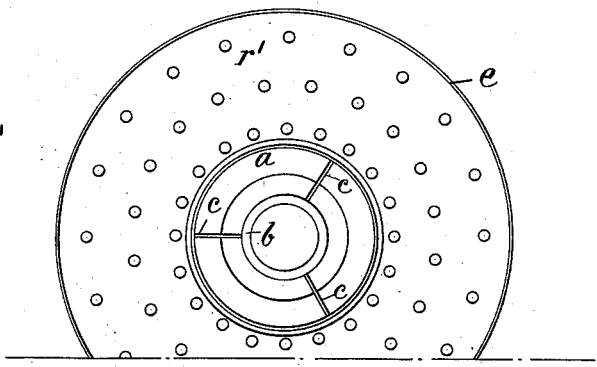
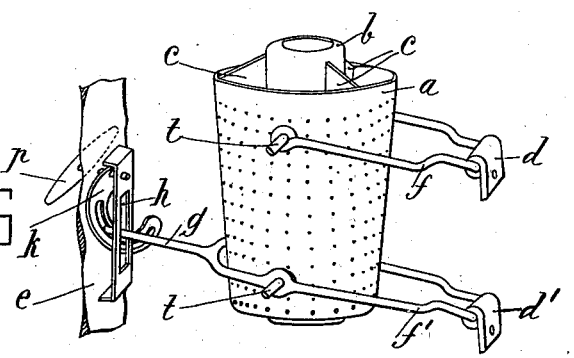
Witnesses
Inventor
Marcel Gervais
by Alexander & Co
Attorneys

UNITED STATES PATENT OFFICE.

MARCEL GERVAIS, OF PARIS, FRANCE.

PETROLEUM-LAMP.

SPECIFICATION forming part of Letters Patent No. 662,930, dated December 4, 1900.

Application filed November 27, 1899. Serial No. 738,348. (No model.)

*To all whom it may concern:*

Be it known that I, MARCEL GERVAIS, a citizen of the Republic of France, residing at Paris, France, have invented certain new and useful Improvements in Petroleum-Lamps, of which the following is a specification.

The heating-lamp which forms the subject of the present invention consists of two essential parts—the vaporizer and the burner of the vessel which contains the petroleum.

Figure 1:
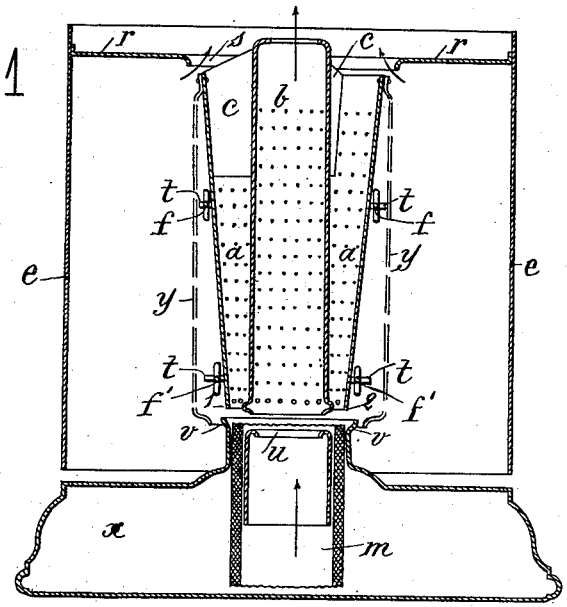
Figure 2:
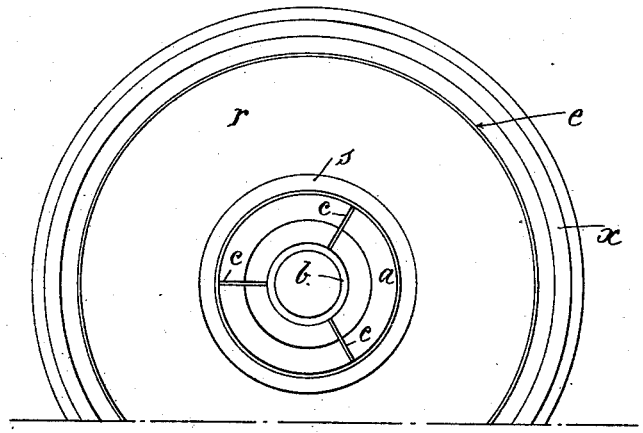

Figure 1 shows a vertical section of a burner embodying my invention. Fig. 2 is a top plan view of the same. Fig. 3 is a vertical section of the upper part of a modification. Fig. 4 is a plan view of the same. Fig. 5 is a perspective view of the lifting devices for the flame-tubes.

The vaporizer is formed of a cylinder $b$ and of a metallic truncated cone $a$, open at their upper and lower ends and kept at the proper distance apart, the cylinder inside the cone, by vertical stays $c$ in such a position that they are concentric with each other and that the lower end of the cylinder is just above the upper end of the wick below. Both the cylinder and the truncated cone (the smaller end of which is below) are pierced with a large number of holes arranged in horizontal rows. In both the cylinder and the cone the holes in the lower row are of larger diameter than the remainder. The outer truncated cone is provided outside with pivots $t$, two being upon each side and opposite to each other near the upper and lower ends of the cone, respectively, and these pivots are suspended in the ends of two horizontal forks $f f'$, parallel to each other and of equal length, turning at their outer ends upon hinges or pivots $d d'$, fixed one above the other to the inside of a metal cylinder $e$ of considerable diameter, which is placed upon the vessel $x$ below, containing the petroleum. The lower one $f'$ of the two forks described is provided with a prolongation on the other side of the cone and ends in a horizontal pin $g$, which can rise and fall in a vertical slot $h$ in or upon the opposite side of the external cylinder to that to which the hinges already described are fixed. A pin, provided with a handle $p$ outside, turns in a hole in the external cylinder and is provided with a curved eccentric arm $k$, having a slot of corresponding shape in which the end of the pin upon the prolongation of the fork works, so that when the handle is turned the fork is raised or lowered, carrying with it the outer cone and interior cylinder, the height of which can therefore be exactly adjusted.

The burner of the circular oil-holder below is cylindrical and has a central air-passage, a cylindrical wick $m$ passing up between the internal and external tubes $u$ $v$ of the burner, which resembles ordinary burners of the kind, except that the upper ends of the tubes which form it are bent over horizontally for a short distance, the inner one inward and the outer one outward, so that they form two angular supports, which when the vaporizer is lowered receive the lower edges of the outer truncated cone $a$ and of the inner cylinder $b$, which compose the vaporizer, respectively. The turned-out edge of the outer cylinder is turned up at its outer edge so as to prevent any current of external air from penetrating to the interior of the truncated cone.

The action of the apparatus is as follows: The vaporizer is raised about a centimeter and the wick is lighted. The vaporizer is then lowered until its lower end is nearly in contact with the burner, and after a moment it is brought down into contact with the latter and the wick is raised. The annular space which is produced by the presence of the central cylinder can receive only a small quantity of air, so that the vapors disengaged from the wick as soon as they are sufficiently abundant cannot burn there completely. Consequently there are formed on the inner surfaces of the cylinder and of the cone two thin layers of flame between which passes and becomes heated in passing the remainder of the vapors, which burn in the free air above and below the vessel which it is desired to heat. Contained between the current of very hot air which comes from the cylinder and the current of exterior air outside the cone, they are completely consumed without discoloring the sides of the vessel. The useful effect of this combustion may be increased by fitting in the upper end of the outer cylinder and a little above the upper end of the cone a horizontal plate $r$, having a circular central opening of a diameter somewhat greater than that of the upper end of the cone. The current of air which passes through the annular space between the edge of this hole and the top of the cone confines the flames and concentrates their action upon the vessel.

When the bottom of the vessel to be heated is of large dimensions, the plate last described may have substituted for it one somewhat differently shaped. (See Figs. 3 and 4.) This plate $r'$ is slightly coned downward, and its central opening surrounds closely, but so as not to touch it, the upper edge of the cone of the vaporizer. It is pierced with a suitable number of holes of a diameter of about three or four millimeters. By reducing the current of exterior air it increases the draft in the interior of the vaporizer, and especially of the cylinder. The flame is consequently directed horizontally and has a greater intensity.

In vaporizers of large size a cylindrical casing $y$, fixed outside the truncated cone, prevents the return of the flame.

The proportions of the apparatus may be varied more or less. In height, for instance, it is only necessary that it should not be inconveniently great, but that there should be sufficient draft to prevent the vapors from passing back to the exterior through the holes described. It might be made of less height and with a smaller wick or of greater height with a larger wick, especially if it were needed to be used as a heating-stove. In the same way the holes may be made smaller, but more numerous, or, on the other hand, less numerous but larger; or, again, their number might be increased while retaining their size or their diameter increased while retaining their number, if with a quicker combustion it were desired to obtain a greater heat of the interior of the vaporizer, and consequently more abundant disengagement of vapor.

I claim—

1. A vaporizer consisting essentially of two concentric perforated metal tubes, having between them an inverted conical annular space, and a wick entering into the lower end of said annular space, whereby the vapors given off from this wick rise and expand in said space and are further heated between the layers of flame which are formed on the surface of the perforated tubes, and finally burn at the top of said tubes between two currents of air, one outside the tubes and the other rising through the inner tube.

2. In a vaporizer, the combination with two concentric perforated metal tubes forming one structure, of two sets of pivots thereon, forks engaged at one end with said pivots and hinged at the other end, a prolongation on one of said forks, and means for raising and lowering said prolongation.

3. In a vaporizer, the combination with two concentric perforated metal tubes forming one structure, of two sets of pivots thereon, forks engaged at one end with said pivots and hinged at the other end, a prolongation on one of said forks terminating in a pin, an upright guide for said pin, and an eccentric engaging said pin to lift and lower it.

4. In a vaporizer, the combination with an annular plate, of two concentric perforated metal tubes between which the heated gases burn, the said tubes being concentric with said plate, the inner tube extending above the outer one, and the upper end of the outer tube rising approximately to the plane of the inner edge of said annular plate, but leaving an annular opening between them, whereby said plate serves to modify the action of the flame by controlling and directing the external current of air feeding said flame.

5. The combination with a vaporizer comprising two perforated concentric tubes between which the heated gases burn, the inner tube extending above the outer one, of a plate $r'$ perforated with holes and having a central opening fitting freely around and in the same plane as the exterior tube of the vaporizer, but sufficiently close to diminish the action of the external current of air and permit the internal current through the inner tubes to produce a more extended flame.

In testimony that I claim the foregoing I have hereunto set my hand this 10th day of November, 1899.

MARCEL GERVAIS.

Witnesses:
EMILE COMHOUD,
EDWARD P. MACLEAN.